(12) United States Patent
Kameyama et al.

(10) Patent No.: US 7,233,355 B2
(45) Date of Patent: Jun. 19, 2007

(54) IMAGING APPARATUS UTILIZING IMAGE PICKUP DEVICES USED FOR AN INTERLACED SCANNING

(75) Inventors: Takashi Kameyama, Kanagawa (JP); Syuichi Akazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 933 days.

(21) Appl. No.: 10/386,058

(22) Filed: Mar. 11, 2003

(65) Prior Publication Data

US 2003/0174225 A1 Sep. 18, 2003

(30) Foreign Application Priority Data

Mar. 13, 2002 (JP) ............................ P2002-068885

(51) Int. Cl.
| | |
|---|---|
| *H04N 3/14* | (2006.01) |
| *H04N 5/335* | (2006.01) |
| *H04N 9/68* | (2006.01) |
| *H04N 5/235* | (2006.01) |
| *H04N 5/238* | (2006.01) |

(52) U.S. Cl. .................. 348/317; 348/235; 348/230.1; 348/364

(58) Field of Classification Search ................ 348/222, 348/305, 317, 235, 230.1, 364
See application file for complete search history.

(56) References Cited

U.S. PATENT DOCUMENTS

| 5,289,269 | A | * | 2/1994 | Sugimori et al. ............ 348/264 |
| 5,726,709 | A | * | 3/1998 | Kinoshita et al. ........... 348/264 |
| 6,542,202 | B2 | * | 4/2003 | Takeda et al. .............. 348/678 |
| 2002/0093587 | A1 | * | 7/2002 | Michel ........................ 348/452 |

* cited by examiner

*Primary Examiner*—Ngoc-Yen Vu
*Assistant Examiner*—Adam L. Henderson
(74) *Attorney, Agent, or Firm*—Frommer Lawrence & Haug LLP; William S. Frommer; Paul A. Levy

(57) ABSTRACT

The invention provides a convenient way of generating image signals on a progressive scanning basis. Multiple image pickup devices used for an interlaced scanning drive and generate chrominance signal DGi on the interlaced scanning basis with an interlace field and chrominance signals DRi and DBi on the interlaced scanning basis with opposite interlace field. Scanning converter receives the chrominance signal Dgi, DRi and Dbi. The scanning converter then performs an interpolation based on the chrominance signals DGi, DRi, and DBi to generate corresponding chrominance signals DGp (DGp-E, DGp-O), DRp (DRp-E, DRp-O), and DBp (DBp-E, DBp-O) on a progressive scanning basis. Signal processor receives the resultant chrominance signals DGp, DRp, and DBp. The scanning converter sums the chrominance signals DGp, DRp, and DBp belonging to a predetermined number of frames to obtain a new set of chrominance signals.

6 Claims, 10 Drawing Sheets

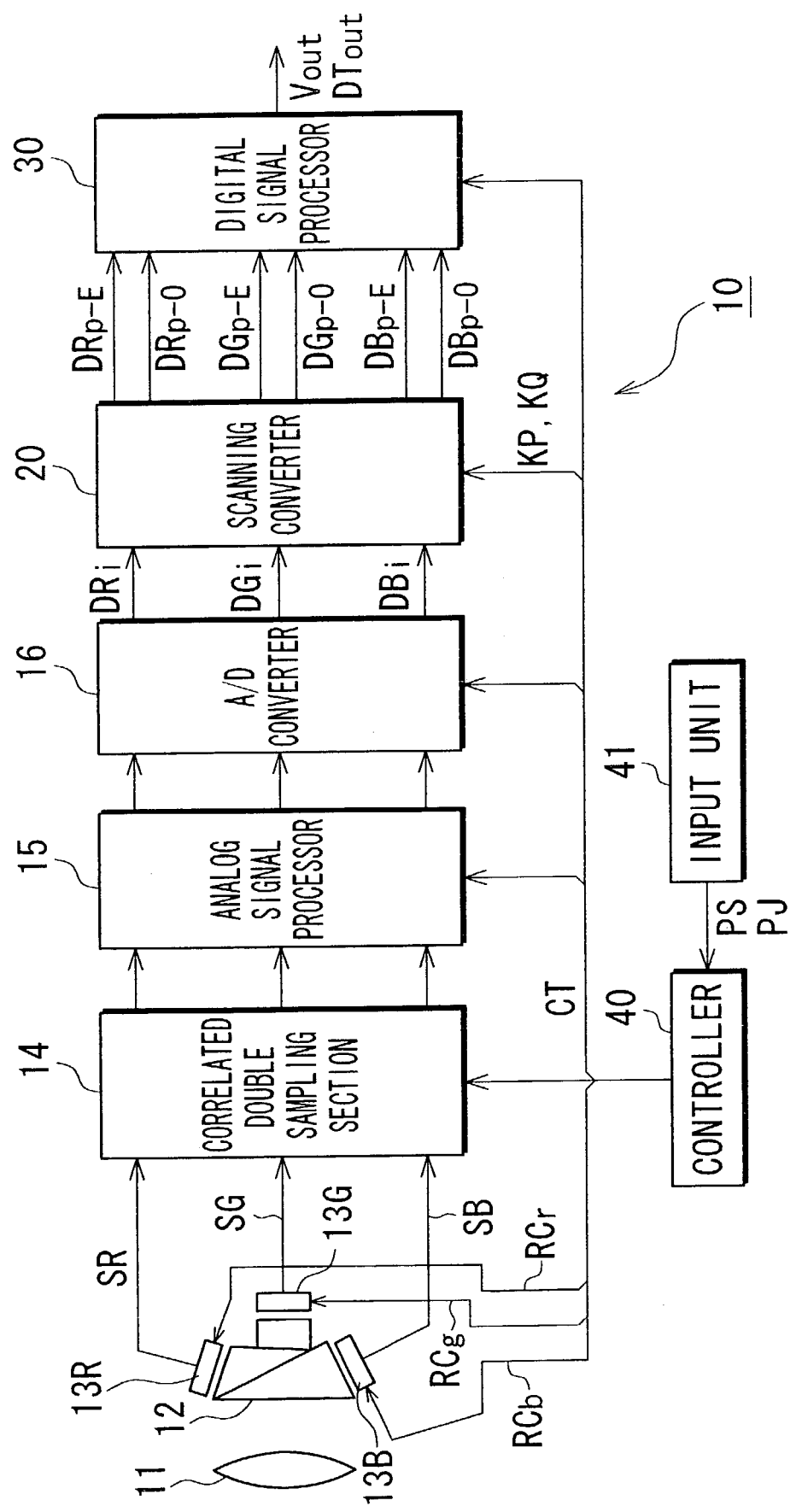

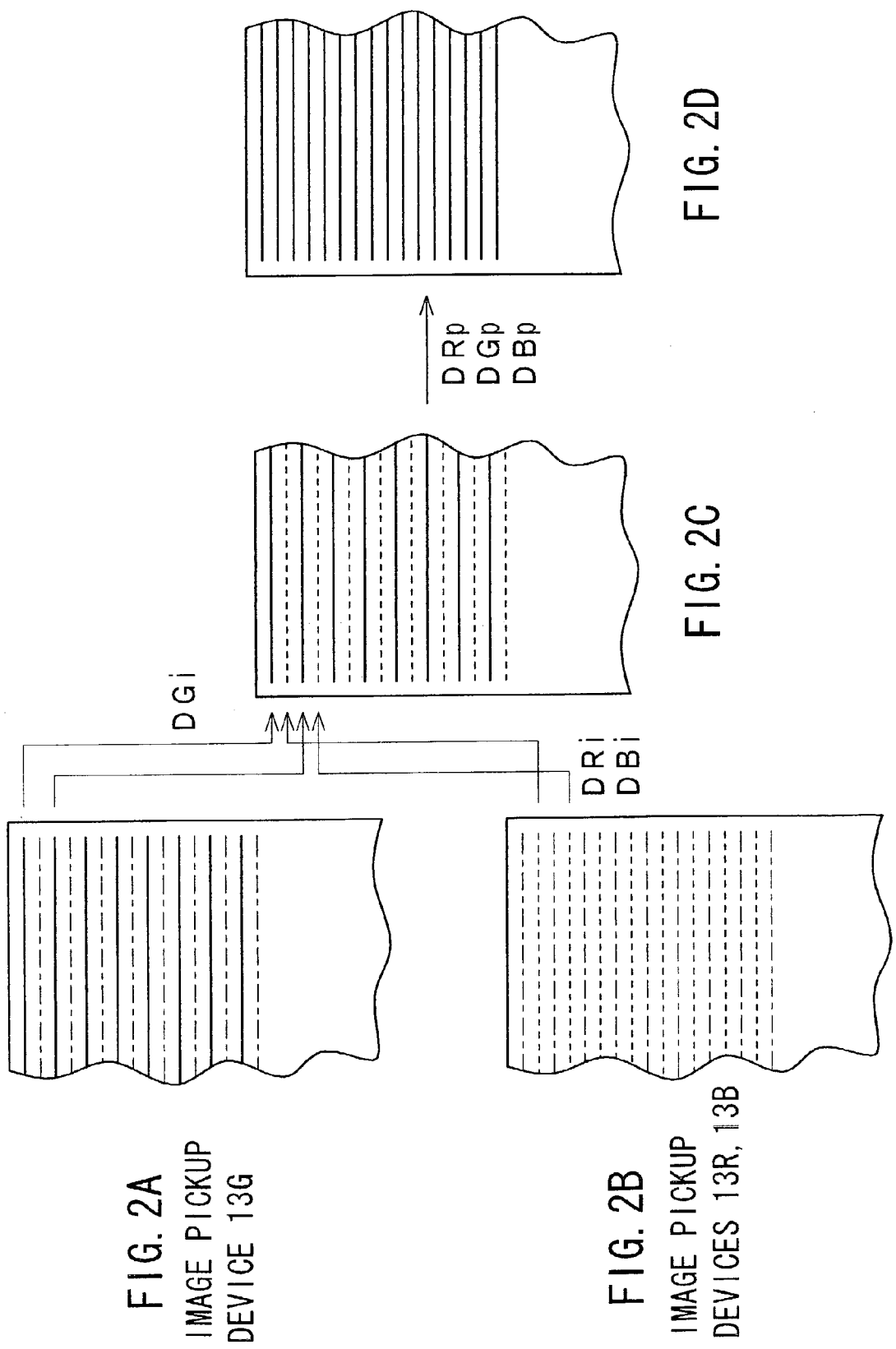

FIG. 3A IMAGE PICKUP DEVICE 13G
CHARGING PERIOD 1 FIELD
FIG. 3B IMAGE PICKUP DEVICES 13R, 13B
FIG. 3C IMAGE PICKUP DEVICE 13G (ODD, EVEN FIELDS)
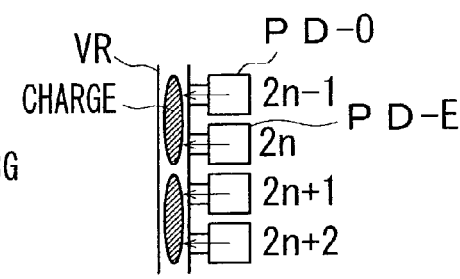
FIG. 3D IMAGE PICKUP DEVICES 13R, 13B (ODD, EVEN FIELDS)
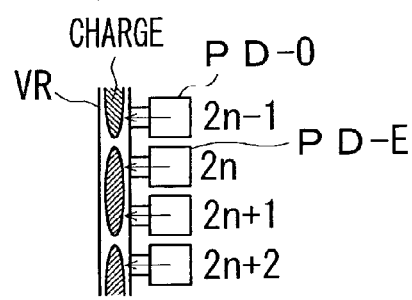
FIG. 3E IMAGE PICKUP DEVICE 13G (ODD, EVEN FIELDS)
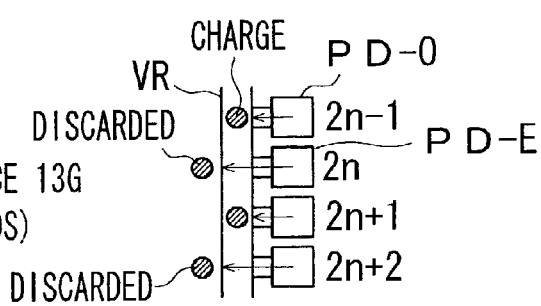
FIG. 3F IMAGE PICKUP DEVICES 13R, 13B (ODD, EVEN FIELDS)
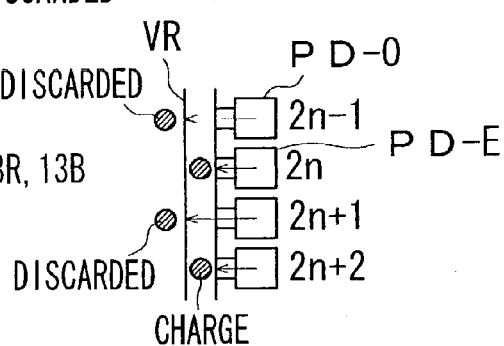

IMAGE PICKUP DEVICE 13G

IMAGE PICKUP DEVICES 13R, 13B

IMAGE PICKUP DEVICE 13G
(ODD FIELDS)

IMAGE PICKUP DEVICE 13G
(EVEN FIELDS)

IMAGE PICKUP DEVICES 13R, 13B
(ODD FIELDS)

IMAGE PICKUP DEVICES 13R, 13B
(EVEN FIELDS)

IMAGE PICKUP DEVICE
13G (ODD LINE)

IMAGE PICKUP DEVICE
13G (EVEN LINE)

IMAGE PICKUP DEVICES
13R, 13B (ODD LINE)

IMAGE PICKUP DEVICES
13R, 13B (EVEN LINE)

IMAGE PICKUP
DEVICE 13G
(ODD FIELDS)

IMAGE PICKUP
DEVICES 13R, 13B
(ODD FIELDS)

IMAGE PICKUP
DEVICE 13G
(EVEN FIELDS)

IMAGE PICKUP
DEVICE 13R, 13B
(EVEN FIELDS)

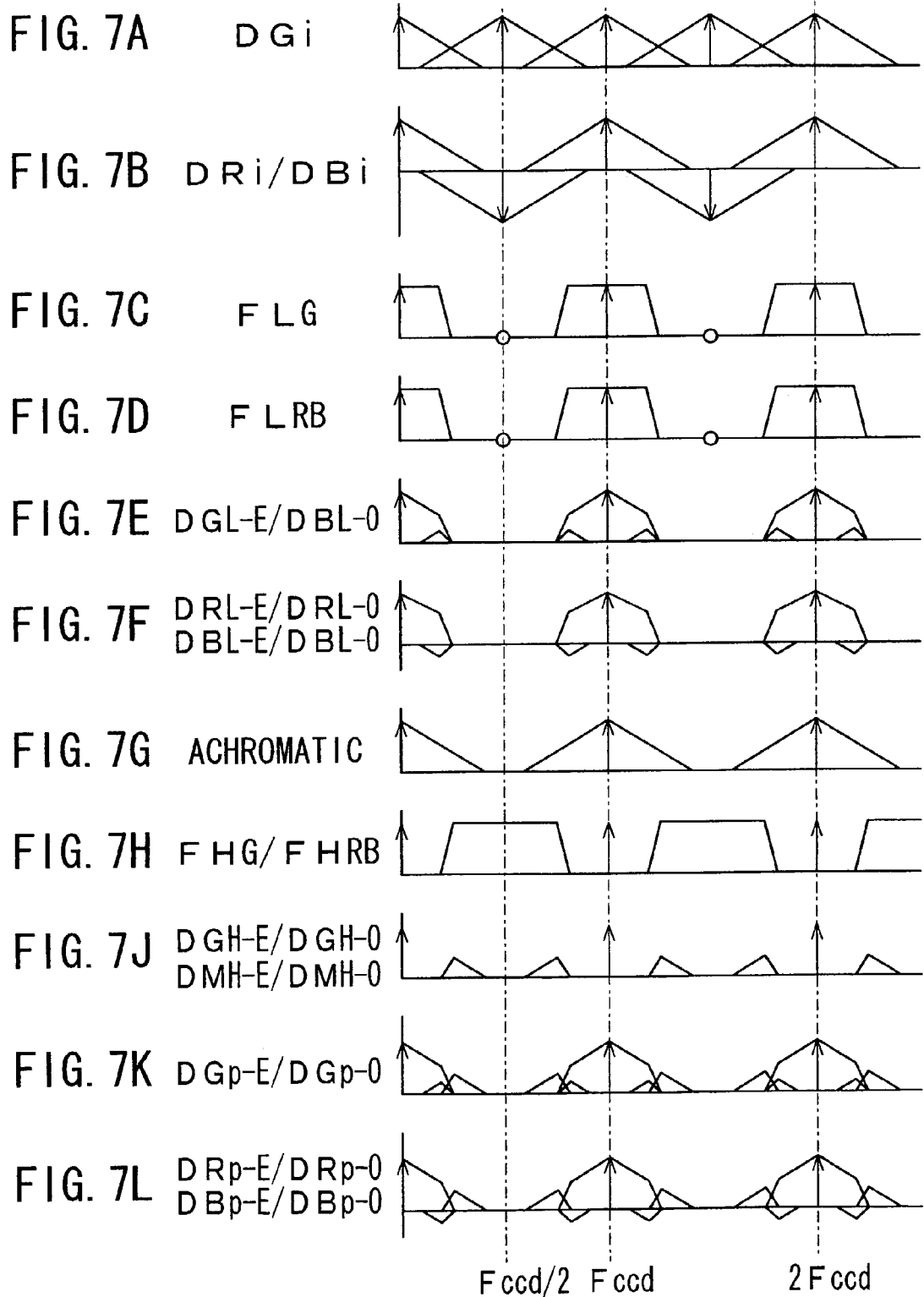

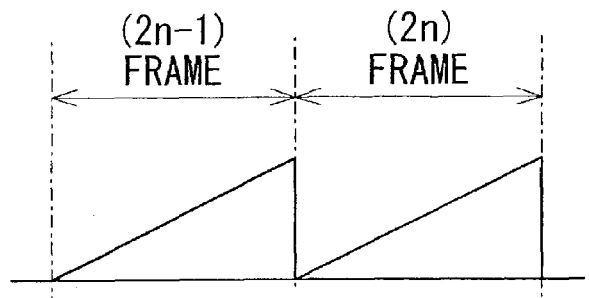
FIG. 10A  NO SHUTTER OPERATION (100%)
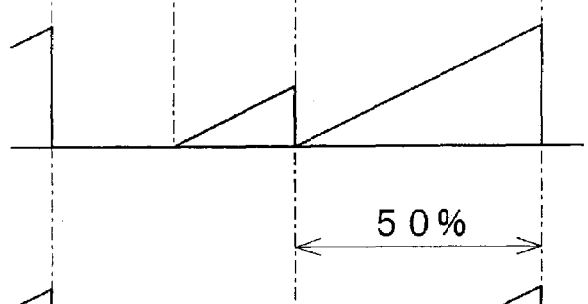
FIG. 10B  EXPOSURE TIME (75%)
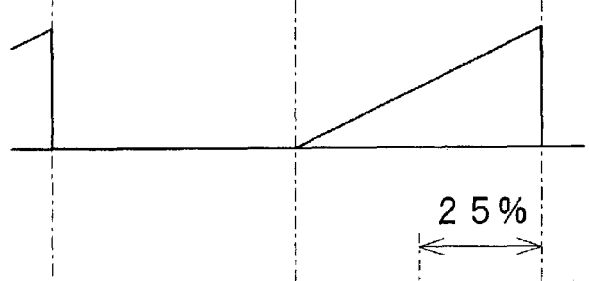
FIG. 10C  EXPOSURE TIME (50%)
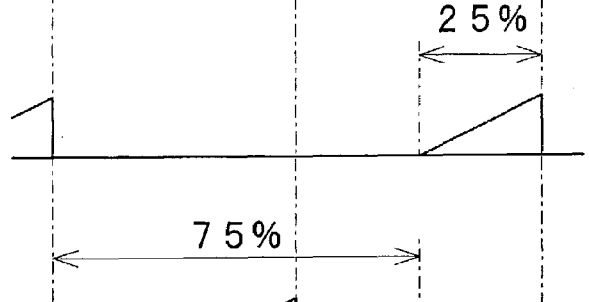
FIG. 10D  EXPOSURE TIME (25%)
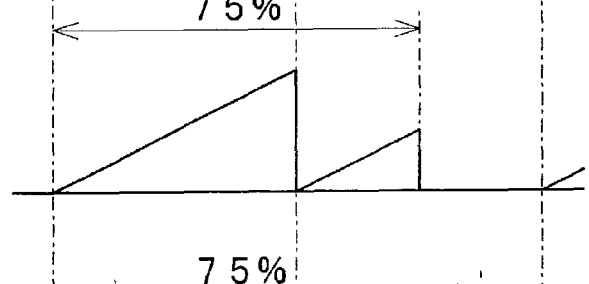
FIG. 10E  EXPOSURE TIME (75%)
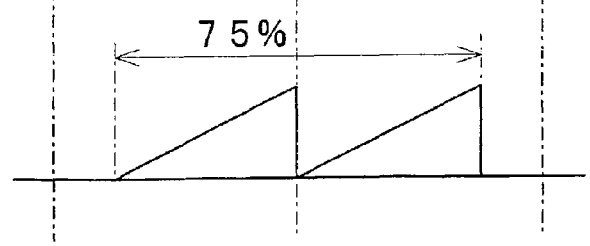
FIG. 10F  EXPOSURE TIME (75%)

IMAGING APPARATUS UTILIZING IMAGE PICKUP DEVICES USED FOR AN INTERLACED SCANNING

FIELD OF THE INVENTION

The invention relates to an imaging apparatus for generating image signals on a progressive scanning basis utilizing image pickup devices used for an interlace scanning.

DESCRIPTION OF RELATED ART

In recent years, image signals on a progressive scanning basis have been used in addition to image signals on an interlaced scanning basis in order to provide an extended definition picture. Use of the image signals on the progressive scanning basis prevents lowering of perpendicular resolution of an image caused by the interline flickers.

In the progressive scanning, however, when interline transfer (IT) typed charge coupled devices (CCDs) or frame interline transfer (FIT) typed CCDs, for example, are used as the image pickup devices, the number of the perpendicular transfer registers (TFRs) for reading electrical charge generated by photo sensors through photoelectric conversion must be doubled as compared with the one used for the interlaced scanning. This makes it difficult to compose a simple and inexpensive imaging apparatus.

Given a same number of the pixels in a frame and a same frame rate (or the same number of frames per unit time), the number of pixels to be read out on the progressive scanning basis is twice the number of pixels to be read out on interlaced scanning basis. As a consequence, a signal processing circuit for processing the image pickup devices and the signals read out of them must be operable at a high speed, thus resulting in extra increases of power consumption and a manufacturing cost.

In order to make the image apparatus operable on the interlaced scanning basis as well as the progressive scanning basis upon switching of the scanning, it is necessary to make the signal processing circuit for process the signals transmitted from driving circuit of the image pickup device or the device itself operable at two different reference operating frequencies, for example 74.25 MHz in the interlaced scanning and 148.5 MHz in the progressive scanning, since the number of the pixels to be read out on the progressive scanning basis is twice the number of pixels on the interlace scanning basis, as discussed above. It, however, is difficult to operate the driving circuit and the signal processing circuit at quite different reference operating frequencies like this. Provision of two separate sets of a drive circuit and a signal processing circuit, one for the interlace scanning and another for the progressive scanning, in one imaging apparatus requires a large area for the circuits, which hinders miniaturization and cost cutting of an imaging apparatus.

SUMMARY OF THE INVENTION

It is, therefore, an object of the invention to provide an imaging apparatus for easily generating image signals on a progressive scanning basis.

In accordance with one aspect of the invention, there is provided an imaging apparatus comprising a multiplicity of image pickup devices used for an interlaced scanning. The imaging apparatus further comprises a controller for controlling the image pickup devices with at least one of the multiple image pickup devices and at least one of remaining image pickup devices thereof being driven on opposite interlaced fields to generate image signals on the interlaced scanning basis out of the respective image pickup devices. The imaging apparatus still further comprises a scanning converter for interpolating the image signals generated on the interlaced scanning basis into each other to generate image signals on a progressive scanning basis.

In accordance with another aspect of the invention, there is provided a method of imaging. The method comprises a step of simultaneously generating image signals on an interlaced scanning basis with mutually different interlace fields by means of a multiplicity of image pickup devices. The method further comprises a step of interpolating the image signals generated on the interlaced scanning basis into each other to generate image signals on a progressive scanning basis.

According to the invention, at least one of the multiple image pickup devices and at least one of the remaining image pickup devices are driven in opposite interlace fields to generate image signals on an interlaced scanning basis. For example, the image pickup devices are driven so that at least one of a red signal and a blue signal, and a remaining green signal can be generated from the image pickup devices according to the opposite interlace fields. Then, the image signals with opposite interlace fields are interpolated into each other, thereby generating image signals on a progressive scanning basis. This allows the image signals to be generated on the progressive scanning basis using image pickup devices used for the interlaced scanning without any image pickup devices used for a progressive scanning. Therefore, this prevents operating frequencies of the image pickup devices from increasing and avoids causing a wide band signal processing circuit to easily implement an imaging apparatus used for the progressive scanning.

Low-frequency and high-frequency components of the green signal are respectively generated on the progressive scanning basis from the green signal generated on the interlaced scanning basis. Similarly, low-frequency and high-frequency components of red and blue signals are respectively generated on the progressive scanning basis from the red and blue signals generated on the interlaced scanning basis. The high-frequency components of the green, red and blue signals are used to generate a luminance-interpolating component to be added to the respective low-frequency components of the respective chrominance signals, thereby generating image signals on the progressive scanning basis. The use of such the frequency-divided image signals allows information in the image signals generated on the interlaced scanning basis to be successfully reproduced in the image signals generated on the progressive scanning basis.

Each of these image signals generated on the progressive scanning basis is summed every a predetermined number of frames. Signals thus summed are outputted as a new image signal. This image signals are generated on the progressive scanning basis with a predetermined frame rate without any major changes to field rates for the image signals generated on the interlaced scanning basis.

When a shutter operation is to be performed, an appropriate exposure time of the shutter is set for the period of the predetermined number of frames. The image pickup devices then output image signals generated on the interlaced scanning basis in response to the exposure time. This allows the imaging apparatus to provide an outstanding image without any false frames.

The image pickup devices are driven with their interlace fields being alternately switched in turn every field periods.

If any residual aliasing components are presented, this permits the residual aliasing components to have little effect on the image signals.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a block diagram representation of an imaging apparatus of the invention;

FIGS. 2A through 2D respectively show operations involved in scanning conversion;

FIGS. 3A through 3F respectively illustrate field read operations in fixed phase mode;

FIGS. 7A through 7L respectively show diagrams illustrating operations of the scanning converter shown in FIG. 6;

FIGS. 10A through 10F respectively illustrate shutter operations according to the invention.

DETAILED DESCRIPTION OF PREFERRED EMBODIMENTS

Figure 4A:
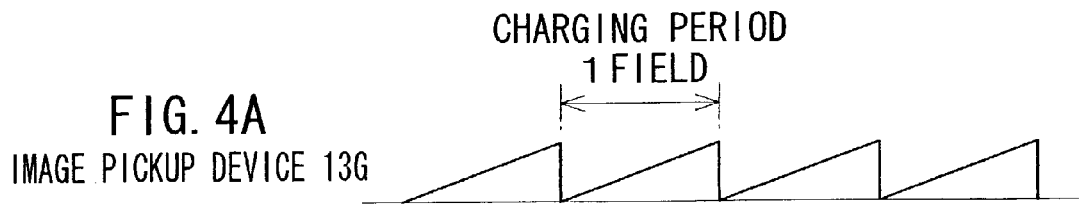
FIGS. 4A through 4F respectively illustrate field read operations in variable phase mode.

FIG. 1 shows a configuration of an imaging apparatus 10 of the invention utilizing an optical unit for RGB color separation and three charge-coupled devices (CCDs).

An incident beam of light emitted from an object enters into a color separation prism 12 via an image pickup lens system 11. The color separation prism 12 is provided on the red component exit face thereof with a CCD used for an interlace scanning that serves as an image pickup device 13R. The prism 12 is also provided on the green and blue component exit faces thereof with CCDs used for the interlace scanning that serve as a green and a blue image pickup devices 13G and 13B, respectively.

The image pickup device 13R drives and reads out electrical charge formed by the red component of the incident light through photoelectric conversion, under the control of a drive signal RCr supplied from a controller 40, which will be described later. The image pickup device 13R generates a red signal SR. A correlated double sampling (CDS) section 14 receives the red signal SR.

Under the control of a drive signal RCg supplied from the controller 40, the image pickup device 13G reads out electrical charge formed by the green component of the incident light to generate a green signal SG. The CDS section 14 receives the green signal SG. Similarly, under the control of a drive signal RCb supplied from the controller 40, the image pickup device 13G reads out electrical charge formed by the blue component of the incident light to generate a blue signal SB. The CDS section 14 receives the blue signal SB.

The CDS 14 removes noises in the three fundamental chrominance signals SR, SG, and SB using a correlated double sampling method, and provides the noise removed signals for an analog signal processor 15. The analog signal processor 15 performs pre-knee processing, pre-gamma processing, and the like thereon and compresses the dynamic ranges of the chrominance signals SR, SG, and SB before they are supplied to an analog-to-digital (A/D) converter 16.

The A/D converter 16 converts the analog chrominance signals SR, SG, and SB processed in the analog signal processor 15 into respective digital chrominance signals DRi, DGi, and DBi and supplies the signals thus converted to a scanning converter 20.

The scanning converter 20 performs an interpolation using the image signals, i.e., chrominance signals DRi, DGi, and DBi, generated on an interlaced scanning basis. The scanning converter 20 then generates image signals or chrominance signals DRp, DGp, and DBp on a progressive scanning basis and supplies the image signals thus generated to a digital signal processor 30. The scanning converter 20 also generates chrominance signals DRp, DGp, and DBp by multiplying the signals DRi, DGi, and DBi by coefficients KP and KQ supplied from the controller 40.

The digital signal processor 30 performs various kinds of processing including gamma processing, outline compensation processing, knee correction processing, and white clip processing. The digital signal processor 30 further generates signals having a format in accord with the type of the device connected to the imaging apparatus 10 based on the chrominance signals thus processed. For example, when a device operable with a component signal or a composite signal is connected, the digital signal processor 30 generates and outputs an output image signal Vout that is adequate for the device. When the digital signal processor 30 is connected to another device via a serial digital interface such as the one known as SMPTE 292M format which complies with an interface format set forth by THE SOCIETY OF MOTION PICTURE AND TELEVISION ENGINEERS (SMPTE), the digital signal processor 30 generates and outputs a signal DTout cast in that format.

The controller 40 is connected to an input unit 41 for supplying to the controller 40, in response to a manipulation of the input unit 41 by a user, an operational signal PS associated with the manipulation. The controller 40 receives various kinds of information PJ for setting the imaging apparatus 10 via the input unit 41. The controller 40 generates different kinds of control signals CT based on the operational signal PS and the setting information PJ to control operations of the different sections of the imaging apparatus 10. This allows the imaging apparatus 10 to operate following the user's instruction. The controller 40 also generates drive signals RCr, RCg, and RCb, and supplies them to the respective image pickup devices 13R, 13G, and 13G. The controller 40 also generates the coefficients KP and KQ for use in generating image signals on a progressive scanning basis, and supplies them to the scanning converter 20.

It is noted that the controller 40 controls the image pickup devices 13R, 13G, and 13B with them being driven to generate chrominance signals of ODD lines and chrominance signals of EVEN lines simultaneously. It is also noted that the scanning converter 20 interpolates the chrominance signals of the ODD lines and EVEN lines into each other to generate associated chrominance signals on a progressive scanning basis.

The NTSC scheme luminance equation based on the SMTPE170M, for example, is given by the following equation (1)

$$Y=0.299R+0.587G+0.114B \qquad (1)$$

where R, G, and B stand for luminance levels of the red, green, and blue signals, respectively, and Y stands for the level of the luminance signal. It will be understood from equation (1) that, when the image pickup devices are divided into a group of the image pickup devices outputting red and blue signals and a remaining image pickup device outputting a green signal, contribution of the red and blue signals to luminance and contribution of the green signal thereto will antagonize most each other if an object is achromatic. Thus, the controller 40 controls the image pickup devices with the devices, 13R and 13G being driven in one interlace field to output therefrom a red signal SR and a blue signal SB, respectively, and at the same time the image pickup device 13G being driven in the opposite interlace field to output a green signal SG.

For example, in scanning ODD fields, the image pickup devices 13G generate green signals SG of ODD lines as shown by solid lines in FIG. 2A. On the other hand, the image pickup devices 13R and 13B generate red signals SR and blue signals SB in EVEN lines in the opposite interlace field as shown by broken lines in FIG. 2B. Dotted lines of FIGS. 2A and 2B represent lines for which no signal is outputted.

In this way, the image pickup devices 13G generates chrominance signals in the ODD lines while the image pickup devices 13R and 13B generate chrominance signals in the EVEN lines. The scanning converter 20 receives chrominance signals comprising line signal components that cannot be obtained on an ordinary interlaced scanning basis, as shown in FIG. 2C. Similarly, in the scanning of EVEN fields, the image pickup device 13G and the image pickup devices 13R and 13B respectively generate chrominance signals with the opposite interlace fields.

The scan converter 20 generates chrominance signals DRp, DGp, and DBp, as shown in FIG. 2D, on a progressive scanning basis using a set of green signal DGi, red signal DRi, and blue signal DBi which are derived from a set of red signal SR, green signal SG, and blue signal SB, respectively.

Operations of the image pickup devices 13R, 13G, and 13B generating chrominance signals will now be described.

Two interlaced scanning methods are used with IT type and FIT type image pickup devices: one known as field readout method and the other known as frame readout method.

FIGS. 3A-3F show how chrominance signals are formed if the field readout method is executed in a fixed phase mode. The image pickup devices 13R, 13G, and 13B respectively read out charge stored in the respective CCDs based on operational signal in each field period as shown in FIGS. 3A and 3B, and generate respective chrominance signals SR, SG, and SB.

In the ODD and the EVEN fields, the image pickup device 13G transfers charge generated by the green component of the incident light from a photo-sensor PD-O of one ODD line and a photo-sensor PD-E of the next EVEN line to a vertical transfer register VR, as shown in FIG. 3C. Charges thus transferred from two lines are added together in the vertical transfer register VR and a green signal SG is generated and output based on the added charges.

In the ODD and the EVEN fields, the image pickup devices 13R and 13B also transfer to the vertical transfer register VR charges generated by the red and blue components of the incident light, respectively, from a photo-sensor PD-E of one EVEN line, which is different from the one associated with the image pickup device 13R, and a photo-sensor PD-O of the next ODD line, as shown in FIG. 3D. The charges transferred from the two lines are added together in the vertical transfer register VR. A red signal SR and a blue signal SB are generated and output based on the added charges.

In this way, the image pickup devices 13R and 13B transfer and read the charges out of the lines shifted by 1 line from the corresponding lines associated with the image pickup device 13G, so that both a green signal SG (corresponding to a solid line in FIG. 2A) and a red and a blue signals (corresponding to a broken line in FIG. 2B) can be obtained.

Alternatively, the image pickup devices may generate chrominance signals based on the charges transferred and read out from photo-sensors PD in one line. In this case, the output power of the image pickup devices lowers since the charges are smaller than the ones obtained from two lines and added together.

In this case, the image pickup device 13G transfers and reads to the vertical transfer register VR the charges generated by the green component of the incident light from photo-sensors PD-O, both in ODD fields and EVEN fields, of one ODD line as shown in FIG. 3E. A green signal SG is generated and output based on the charges thus read out. As shown in FIG. 3F, the image pickup devices 13R and 13G transfer and read to the vertical transfer register VR the charges generated on the basis of the red and blue components of the incident light, respectively, by photo-sensors PD-E of an EVEN line in each of the ODD and EVEN fields. A red signal SR and a blue signal SB are generated and output based on the charges thus read out. By outputting the chrominance signals in this way, the green signal SG, red signal SR, and blue signal SB are generated at the respective positions as shown in FIGS. 2A and 2B. It is noted that the charges transferred and read out by the image pickup device 13G from the photo-sensors PD-E of the EVEN line thereof will be discarded since the charges are not used to generate chrominance signals. So are the charges transferred and read out by the image pickup devices 13R and 13G from the photo-sensors PD-O of the ODD line thereof for the same reason. Techniques for discarding the charges are well known in the art, and hence will not be described here.

Figure 4B:
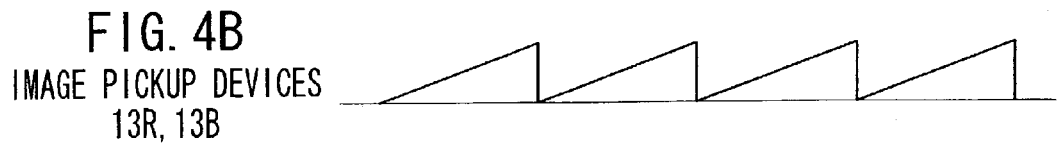

FIGS. 4A-4F illustrate operations of generating chrominance signals when the field readout method is executed in a variable phase mode. The image pickup devices 13R, 13G, 13B respectively read out charge stored in the respective CCDs based on operational signal in each field period as shown in FIGS. 4A and 4B, and generate respective chrominance signals SR, SG, and SB, respectively.

Figure 4C:
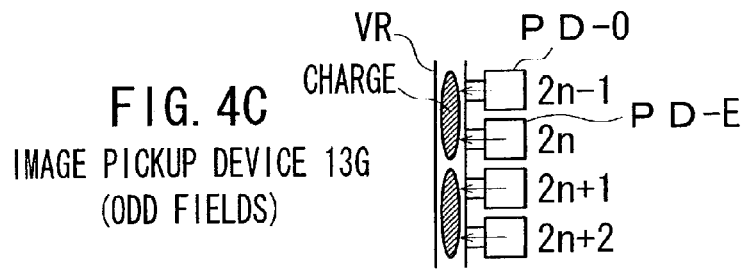

In an ODD field, the image pickup device 13G transfers charge generated by the green component of the incident light from a photo-sensor PD-O of one ODD line and a photo-sensor PD-E of the next EVEN line to a vertical transfer register VR, as shown in FIG. 4C. Charges thus transferred from two lines are added together in the vertical transfer register VR and a green signal SG is generated and output based on the added charges.

Figure 4D:
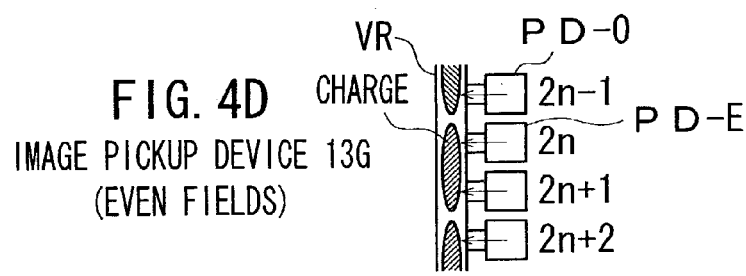

In an EVEN field, the image pickup device 13G then transfers charge generated by the green component of the incident light from a photo-sensor PD-E of one EVEN line and a photo-sensor PD-O of the next ODD line to a vertical transfer register VR, as shown in FIG. 4D. Charges thus transferred from two lines are added together in the vertical transfer register VR and a green signal SG is generated and output based on the added charges.

Figure 4E:
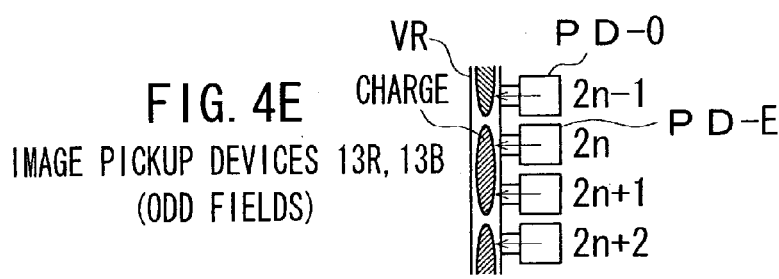

In an ODD field, the image pickup devices 13R and 13B transfer charges generated by the red and blue components of the incident light from a photo-sensor PD-E of one EVEN line and a photo-sensor PD-O of the next ODD line to a vertical transfer register VR, as shown in FIG. 4E. Charges thus transferred from two lines are added together in the vertical transfer register VR and a red signal SR and a blue signal SB are generated and output based on the added charges.

Figure 4F:
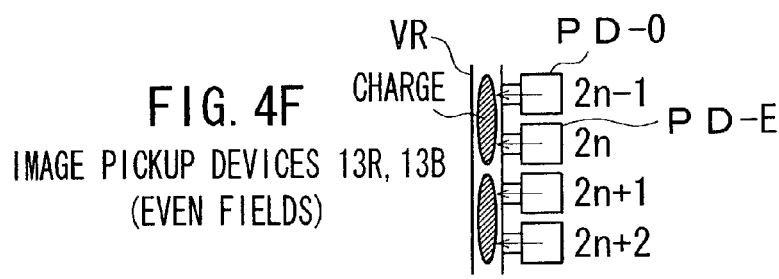

In an EVEN field, the image pickup devices 13R and 13B transfer charges generated by the red and blue components of the incident light from a photo-sensor PD-O of one ODD line and a photo-sensor PD-E of the next EVEN line to the vertical transfer register VR, as shown in FIG. 4F. Charges thus transferred from two lines are added together in the vertical transfer register VR and a red signal SR and a blue signal SB are generated and output based on the added charges.

In this way, the image pickup devices 13R and 13B transfer and read the charges out of the lines shifted by 1 line from the corresponding lines associated with the image pickup device 13G, so that both a green signal SG (corresponding to a solid line in FIG. 2A) and a red and a blue signals (corresponding to a broken line in FIG. 2B) can be also obtained in the variable phase mode.

As in the fixed phase mode, the image pickup devices can generate chrominance signals from the charges transferred and read out from the photo-sensors PD in one line.

In this instance, the image pickup device 13G transfers and reads to the vertical transfer register VR the charges generated by the green component of the incident light from photo-sensors PD-O of one ODD line in ODD fields and photo-sensors PD-E of one EVEN line in EVEN fields, for example. A green signal SG is generated and output based on the charges thus read out. The image pickup devices 13R and 13G may transfer and read to the vertical transfer register VR the charges generated on the basis of the red and blue components of the incident light, respectively, from photo-sensors PD-E of an EVEN line in the ODD fields and photo-sensors PD-O of an ODD line in the EVEN fields. A red signal SR and a blue signal SB can be generated and output based on the charges thus read out. As in the case described above, when charge data of two lines are not added, charges not used to generate chrominance signals will be discarded so as not to be added to the charge that will be stored in the next field period.

Figure 5A:
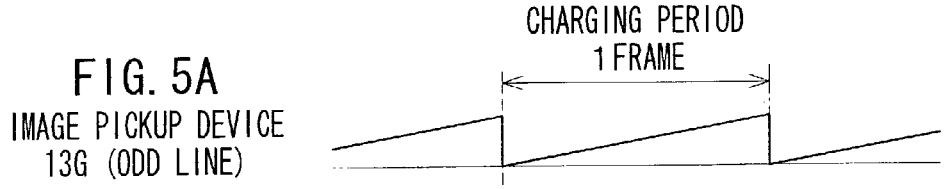
FIGS. 5A through 5H respectively illustrate frame read operations.
Figure 5B:
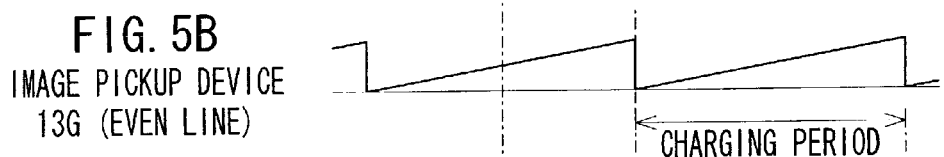
Figure 5C:
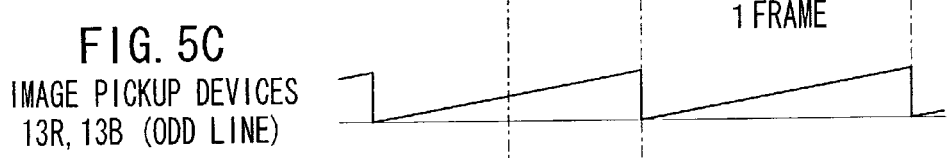
Figure 5D:
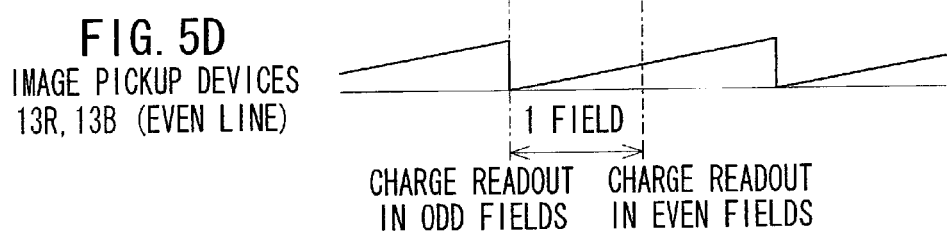

FIGS. 5A-5H show operations of generating chrominance signals when the frame readout method is executed. It is seen that the charging time of the image pickup device 13G in an ODD line (see FIG. 5A) is in phase with that of the image pickup devices 13R and 13B in an EVEN line (see FIG. 5D), and the charging time of the image pickup device 13G in an EVEN line (see FIG. 5B) is in phase with that of the image pickup devices 13R and 13B in an ODD line (FIG. 5C). Stored charges are transferred and read out in each frame period, thereby generating and outputting chrominance signals SR, SG and SB.

Figure 5E:
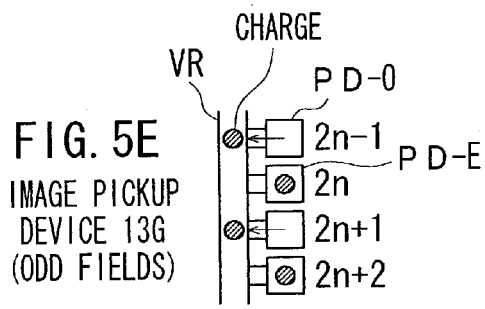

In an ODD field, the image pickup device 13G transfers to the vertical transfer register VR the charge generated by the green component of incident light from a photo-sensor PD-O in one ODD line, as shown in FIG. 5E. A green signal SG is generated based on the charge thus transferred. In an EVEN field, the image pickup device 13G also transfers to the vertical transfer register VR the charge generated by the green component of the incident light from a photo-sensor PD-E in an EVEN line, as shown in FIG. 5F. A green signal SG is also generated based on the charge thus transferred.

Figure 5G:
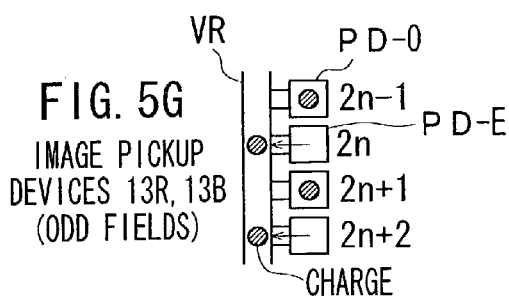
Figure 5F:
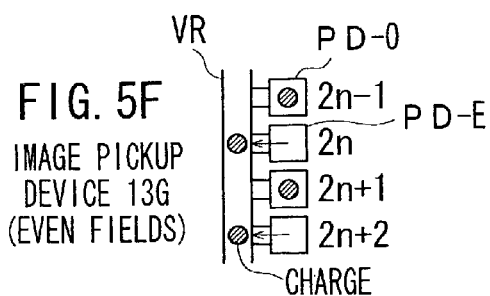
Figure 5H:
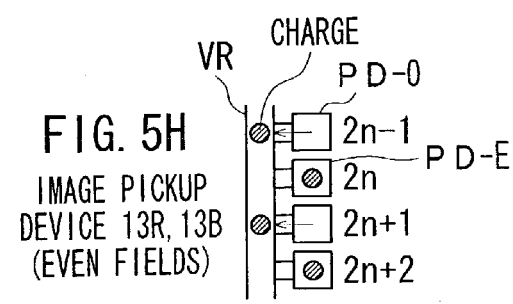

In ODD fields, the image pickup devices 13R and 13B transfer to the vertical transfer register VR the charges generated by the red and blue components of the incident light from photo-sensors PD-E in an EVEN line, as shown in FIG. 5G. A red signal SR and a blue signal SB are generated based on the respective transferred charges. In an EVEN field, the image pickup devices 13R and 13G transfer to the vertical transfer register VR the charge generated by the red and blue components of the incident light from photo-sensors PD-O in an ODD line, as shown in FIG. 5H. A red signal SR and a blue signal SB are generated based on the charges thus transferred.

In this way, the image pickup devices 13R and 13B transfer and read the charges out of the lines shifted by 1 line from the corresponding lines associated with the image pickup device 13G, so that both a green signal SG (corresponding to a solid line in FIG. 2A) and a red and a blue signals (corresponding to a broken line in FIG. 2B) can be also obtained. It will be apparent that even if replacement of the ODD lines by the EVEN lines and the EVEN lines by ODD lines in cases shown in FIGS. 3A-5H is performed, the same line arrangement of chrominance signals as shown in FIG. 2C can be obtained.

Figure 6:
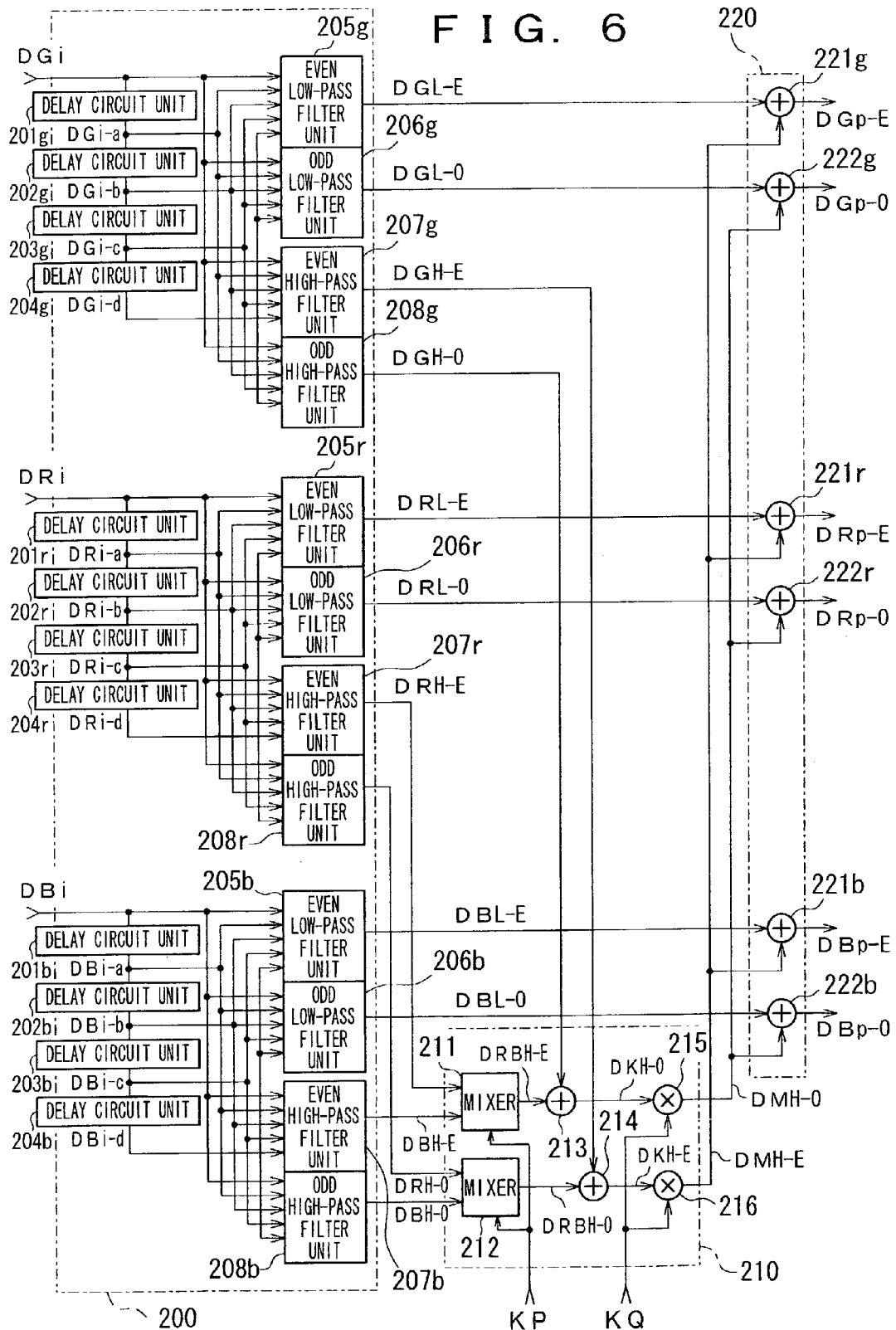
FIG. 6 is a block diagram representation of a configuration of a scanning converter of the invention.

Referring to FIGS. 6 and 7A through 7L, operations of generating image signals on a progressive scanning basis from image signals generated on an interlaced scanning basis will be described and interpolated into each other. FIG. 6 shows a configuration of a scanning converter 20. FIGS. 7A-7L illustrate a process of dividing the frequency band of each of the image signals generated on an interlaced scanning basis into different frequency components and performing luminance interpolation (interpolation in relation to luminance) for the frequency divided components to generate image signals on a progressive scanning basis.

FIG. 6 particularly shows the scanning converter 20 for generating chrominance signals DGp, DRp, and DBp on a progressive scanning basis from chrominance signals DGi, DRi, and DBi generated on an interlaced scanning basis.

The frequency component generation section 200 includes: delay circuit units 201g-204g, 201r-204r, and 201b-204b; EVEN low-pass filter units 205g, 205r, and 205b; ODD low-pass filter units 206g, 206r, and 206b; EVEN high-pass filter units 207g, 207r, and 207b; and ODD high-pass filter units 208g, 208r and 208b. The chrominance signal DGi is supplied to a delay circuit unit 201g, an EVEN low-pass filter unit 205g, an ODD low-pass filter unit 206g, an EVEN high-pass filter unit 207g, and an ODD high-pass filter unit 208g of the frequency component generation section 200.

The chrominance signal DGi is delayed in the delay circuit unit 201g by a period of time for scanning 1 horizontal line (referred to as 1 line period). The delayed signal is then supplied as a chrominance signal DGi-a to the delay circuit unit 202g, the EVEN low-pass filter unit 205g, the ODD low-pass filter unit 206g, the EVEN high-pass filter unit 207g, and the ODD high-pass filter unit 208g.

The chrominance signal DGi-a is further delayed in the delay circuit unit 202g by 1 line period. The delayed signal is then supplied as a chrominance signal DGi-b to the delay circuit unit 203g, the EVEN low-pass filter unit 205g, the ODD low-pass filter unit 206g, the EVEN high-pass filter unit 207g, and the ODD high-pass filter unit 208g. The chrominance signal DGi-b is further delayed in the delay circuit unit 203g by 1 line period. The delayed signal is then supplied as a chrominance signal DGi-c to the delay circuit unit 204g, the EVEN low-pass filter unit 205g, the ODD low-pass filter unit 206g, the EVEN high-pass filter unit 207g, and the ODD high-pass filter unit 208g.

Further, the chrominance signal DGi-c is delayed in the delay circuit unit 204g by 1 line period. The delayed signal is ten supplied to the EVEN low-pass filter unit 205g, the ODD low-pass filter unit 206g, the EVEN high-pass filter unit 207g, and the ODD high-pass filter unit 208g as a chrominance signal DGi-d.

Similarly, a chrominance signal DRi, which is a signal with an interlace field different from that of the chrominance signal DGi, is delayed in the delay circuit units 201r, 202r, 203r, and 204r in turn. The corresponding outputs are supplied therefrom as respective chrominance signals DRi-a, DRi-b, DRi-c, and DRi-d, together with the chrominance signal DRi, to the EVEN low-pass filter unit 205r, the ODD low-pass filter unit 206r, the EVEN high-pass filter unit 207r, and the ODD high-pass filter unit 208r.

In the same manner, the chrominance signal DRi, which is a signal with an interlace field different from that of the chrominance signal DGi, is delayed in the delay circuit units 201b, 202b, 203b, and 204b in turn. The corresponding outputs are supplied therefrom as respective chrominance signals DBi-a, DBi-b, DBi-c, and DBi-d, together with the chrominance signal DBi, to the EVEN low-pass filter unit 205b, the ODD low-pass filter unit 206b, the EVEN high-pass filter unit 207b, and the ODD high-pass filter unit 208b.

FIGS. 7A-7L show the operations of the scanning converter 20 using frequency spectra of the image signals. Denoting by Fccd the spatial sampling frequency in the vertical direction during a raster scan, i.e., during scanning of the entire pixels by the image pickup device 13G, the spatial sampling frequency in the vertical direction of the interlacing turns out to be Fccd/2. The frequency components of the chrominance signal DGi in the vertical direction will result as shown in FIG. 7A. Since the chrominance signals DRi and DBi have different interlace fields as compared with the chrominance signal DGi, their phases differ from that of the chrominance signal DGi by π. Consequently, the ODD orders of the frequency components of the chrominance signals DRi and DBi in the vertical direction are inverted, as shown in FIG. 7B.

The scanning converter 20 forms a finite impulse response (FIR) filter including the delay circuit units 201g, 202g, 203g, 204g, and EVEN low-pass filter unit 205g. This EVEN low-pass filter unit 205g successively selects, for example, four chrominance signals out of the chrominance signals DGi, DGi-a, DGi-b, DGi-c, and DGi-d supplied, and multiplies each of the selected chrominance signals by a filtering factor in response to a preferred characteristic. The EVEN low-pass filter unit 205g then sums the resultant multiplied signals to generate a low-pass filtered chrominance signal DGL-E.

The ODD low-pass filter unit 206g also has a similar structure to that of the EVEN low-pass filter unit 205g. The delay circuit units 201g, 202g, 203g, and 204g and the ODD low-pass filter unit 206g together form a FIR filter. The ODD low-pass filter unit 206g outputs a low-pass filtered chrominance signal DGL-O.

The EVEN low-pass filter unit 205g is adapted to have a pass band below Fccd/4. Similarly, the ODD low-pass filter unit 206g is also adapted to have a pass band below Fccd/4. The filter characteristic FLG is shown in FIG. 7C. If the chrominance signal DGi of FIG. 7A is filtered by a low-pass filter having the filter characteristic FLG of FIG. 7C, the resultant chrominance signals DGL-E and DGL-O have frequency components as shown in FIG. 7E.

In the same manner as for the green signal DGi, a low-pass filter for the red signal DRi may be formed to have a pass band below Fccd/4. The low pass filter can be formed by the delay circuit units 201r, 202r, 203r, and 204r together with the EVEN low-pass filter unit 205r or the ODD low-pass filter unit 206r. A similar low-pass filter may be formed for the blue signal Dbi. The filter may be formed of the delay circuit units 201b, 202b, 203b, and 204b together with either the EVEN low-pass filter unit 205b or the ODD low-pass filter unit 206b. The filtering characteristic FLRB of the low-pass filter is shown in FIG. 7D. If the chrominance signals DRi and DBi of FIG. 7B are filtered by a low-pass filter having the filter characteristic FLRB as shown in FIG. 7D, the resultant chrominance signals DRL-E, DRL-O, DBL-E and DBL-O have frequency components as shown in FIG. 7F.

If one looks at the pixels, in the vertical direction, of the chrominance signal DGi and the signals DRi and DBi arranged alternately as shown in FIG. 2C, the chrominance signals DGi, DRi, and DBi appear in the order mentioned. If the object were achromatic, the three signals would have frequency components as shown in FIG. 7G.

The scan converter 20 also forms a FIR filter including the delay circuit units 201g, 202g, 203g, 204g, and EVEN high-pass filter unit 207g. This EVEN high-pass filter unit 207g successively selects, for example, four chrominance signals out of the supplied chrominance signals DGi, DGi-a, DGi-b, DGi-c, and DGi-d, and multiplies each of the selected chrominance signals by a filtering factor in response to a preferred filter characteristic. The EVEN high-pass filter unit 207g then adds the multiplied signals together to generate a high-pass filtered chrominance signal DGH-E.

The ODD high-pass filter unit 208g also has a structure similar to that of the EVEN high-pass filter unit 207g. The delay circuit units 201g, 202g, 203g, and 204g and the ODD high-pass filter unit 208g also form a FIR filter. The ODD high-pass filter unit 208g outputs a high-pass filtered chrominance signal DGH-O.

The EVEN high-pass filter unit 207g is adapted to have a filtering characteristic with frequency components higher than that of the above low-pass filter unit 206r. The unit 207g illustratively has a characteristic having a pass band above Fccd/4 that is removed using the above-mentioned low-pass filter. Similarly, the ODD high-pass filter unit 208g is adapted to have a high band pass above Fccd/4. The filtering characteristic FHG of each of these high-pass filter units is shown in FIG. 7H. If a chrominance signal having frequency components as shown in FIG. 7G is filtered by a high-pass filter unit having the filter characteristic FHG as shown in FIG. 7H, the resultant chrominance signals DGH-E and DGH-O have frequency components as shown in FIG. 7J.

In the same manner as for the green signal DGi, high-pass filters having the above the high-pass filtering characteristics are formed for the red signal DRi by the delay circuit units 201r, 202r, 203r, and 204r together with either the EVEN high-pass filter unit 207r or the ODD high-pass filter unit 208r. Similarly, high-pass filters are formed for the blue signal DBi by the delay circuit units 201b, 202b, 203b, and 204b together with either the EVEN high-pass filter unit 207b or the ODD high-pass filter unit 208b. The filtering characteristic FHRB of the high-pass filters is similar to that of FIG. 7H. If a chrominance signal having frequency components as shown in FIG. 7G is filtered by a high-pass filter having the filtering characteristic FHRB as shown in FIG. 7H, the resultant chrominance signals DRH-E, DRH-O, DBH-E, and DBH-O have frequency components same as the ones shown in FIG. 7J.

The signal DGL-E outputted from the EVEN low-pass filter unit 205g is supplied to an adder 221g of a component adding section 220. The component adding section 220 consists of adders 221g, 221r, 221b, 222g, 222r, and 222b. The signal DGL-O outputted from the ODD low-pass filter unit 206g is supplied to the adder 222g. Further, the signal DGH-E outputted from the EVEN high-pass filter unit 207g is supplied to an adder 214 of a luminance interpolating component generation section 210. The signal DGH-O that is outputted from the ODD high-pass filter unit 208g is supplied to an adder 213 of the luminance interpolating component generation section 210.

The signal DRL-E outputted from the EVEN low-pass filter unit 205r is supplied to the adder 221r. The signal DRL-O outputted from the EVEN low-pass filter unit 206r is supplied to the adder 222r. Moreover, the signal DRH-E outputted from the EVEN high-pass filter unit 207r is supplied to a mixer 211 of the luminance interpolating component generation section 210. The signal DRH-O that is outputted from the ODD high-pass filter unit 208r is supplied to a mixer 212 of the luminance interpolating component generation section 210.

The signal DBL-E outputted from the EVEN low-pass filter unit 205b is supplied to the adder 221b. The signal DBL-O outputted from the ODD low-pass filter unit 206b is supplied to the adder 222b. Moreover, the signal DBH-E outputted from the EVEN high-pass filter unit 207b is supplied to the mixer 211 of the luminance interpolating component generation section 210. The signal DRH-O that is outputted from the ODD high-pass filter unit 208b is supplied to the mixer 212 of the luminance interpolating component generation section 210.

The luminance interpolating component generation section 210 generates as luminance interpolating components, signal DMH-E and DMH-O, from the signals DGH-E, DRH-E, and DBH-E supplied from the respective EVEN high-pass filter units 207g, 207r, and 207b, and the signals DGH-O, DRH-O and DBH-O supplied from the respective ODD high-pass filter units 208g, 208r, and 208b.

The mixer 211 mixes the signals DRH-E and DBH-E with a mixing proportion specified by a coefficient KP supplied from the controller 40 to generate a signal DRBH-E. This signal DRBH-E is supplied to the adder 213. Similarly, the mixer 212 mixes the signals DRH-O and DBH-O in a mixing proportion specified by the coefficient KP supplied from the controller 40 to generate a signal DRBH-O. This signal DRBH-O is supplied to the adder 214. As an example, the mixers 211 and 212 multiply the signal DRH by the coefficient KP ($0 \leq KP \leq 1$) and multiply the signal DBH by a coefficient (1-KP), and add the two products together to generate the signal DRBH.

By properly varying the mixing proportion according to a variation of the coefficient KP, reproducibility of original color information can be improved as compared with the case where the coefficient KP is not variable. For example, when a cyanic object that contains a lot of blue and green components is taken, the signal DBH may be enhanced by decreasing the coefficient KP to reproduce the original color. Similarly, when taking an yellowish object that contains a lot of red and green components, reproducibility of the original color information can be increased by increasing the coefficient KP to enhance the signal DBH, as compared with the case in which the coefficient KP is not varied. Alternatively, the signal DRH generated from the red signal DRi and the signal DBH generated from the blue signal DBi may be mixed in accordance with the luminance equation.

The adder 213 generates a sum signal DKH-O by adding together the signals DGH-O and DRBH-E. The sum signal DKH-O is supplied to an adder 215 of the luminance interpolating component generation section 210. An adder 214 adds up the signals DGH-E and DRBH-O to generate a sum signal DKH-E The sum signal DKH-E is supplied to an adder 216 of the luminance interpolating component generation section 210.

The adder 215 multiplies the sum signal DKH-O by a coefficient KQ supplied from the controller 40 and supplies the resultant product DMH-O to the adders 222r, 222g, and 222b. The adder 216 multiplies the sum signal DKH-E by the coefficient KQ and supplies the resultant product DMH-E to the adders 221 r, 221 g, and 221b.

The proportions of high-frequency components to be added in the adders 215 and 216 may be regulated by varying the coefficient KQ used in the adders 215 and 216. Proportions of high-frequency components in the chrominance signals DRp, DGp, and DBp (described later) outputted from the adders 221 and 222 can be increased by increasing the coefficient KQ, and can be decreased by decreasing the coefficient KQ.

The adder 221g of the component adding section 220 adds the luminance-interpolating component (signal DMH-E) to the low-frequency component (signal DGL-E) to output a chrominance signal DGp-E. The adder 222g adds the luminance-interpolating component (signal DMH-O) to the low-frequency component (signal DGL-O) to output a chrominance signal DGp-O. Similarly, the adder 221r adds the signal DMH-E to the signal DRL-E to output a chrominance signal DRp-E and the adder 222r adds the signal DMH-O to the signal DRL-O to output a chrominance signal DRp-O. The adder 221b adds the signal DMH-E to the signal DBL-E to output a chrominance signal DBp-E. The adder 222b adds the signal DMH-O to the signal DBL-O to output a chrominance signal DBp-O.

It is noted that the chrominance signals DGp-E and DGp-O outputted from the adders 221g and 222g, respectively, have frequency components as shown in FIG. 7K, which are the sums of the frequency components of FIG. 7E and of FIG. 7J. Similarly, the chrominance signals DRp-E, DRp-O, DBp-E and DBp-O outputted from the respective adders 221r, 221b, 222r, and 222b have frequency components as shown in FIG. 7L, which are the sums of the components of FIG. 7F and 7J. These chrominance signals DGp-E, DGp-O, DRp-E, DRp-O, DBp-E, and DBp-O outputted from the respective adders 221g, 222g, 221r, 221b, 222r, and 222b maintain substantially the whole original information. The chrominance signals have bandwidths as shown in FIGS. 7E and 7F.

In this manner, the frequency component generation section 200 generates low-frequency components and high-frequency components higher than the low-frequency components of the progressive image signals DGp, DRp, and DBp, using the chrominance signals DGi, DRi, and DBi. The luminance interpolating component generation section 210 generates signal DMH as the luminance-interpolating component using high-frequency components of the respective chrominance signals. In addition, since the component adding section 220 adds the signal DMH to each low-frequency component of the progressive image signals DGp, DRp, and DBp to perform luminance interpolation, image signals are generated on the progressive scanning basis with original information being well reproduced. It is noted that the original color information can be reproduced without any difficulty, since the frequency bands carrying color information is included in the low-frequency components.

Figure 8A:
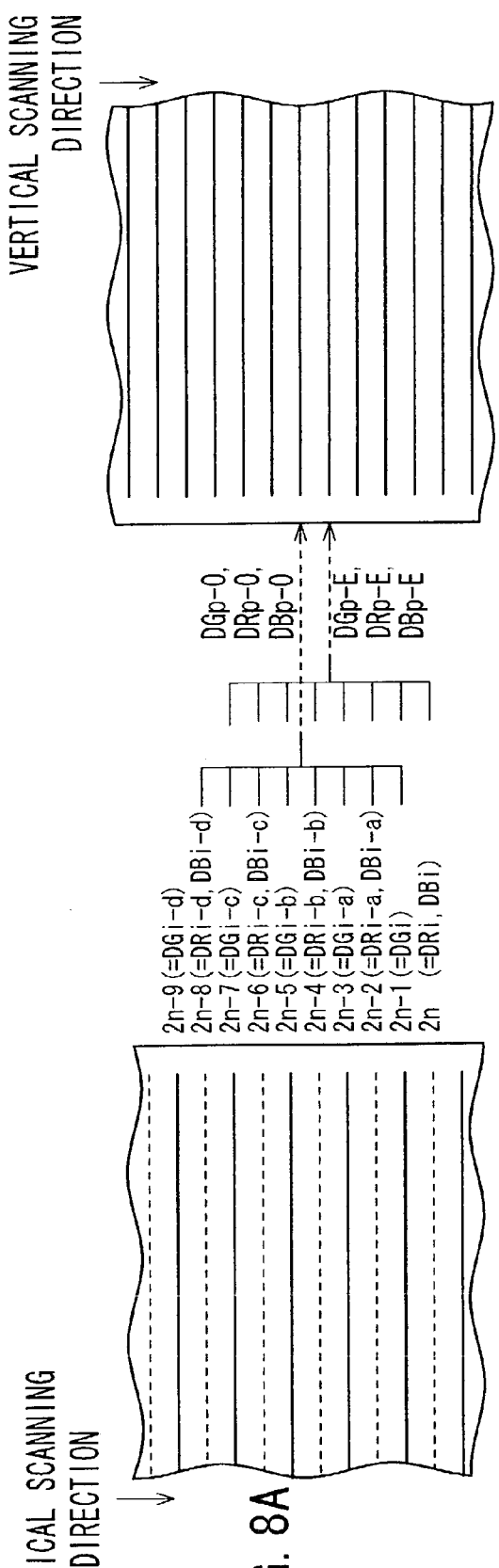
FIGS. 8A and 8B respectively illustrates operations of the scanning conversion.

Operations of scanning conversion will now be described. Supposing now that the image pickup device 13G generates a chrominance signal SG of an ODD line, and the image pickup devices 13R and 13B respectively generate chrominance signals SR and SB of an EVEN line, the EVEN low-pass filter unit 205g, ODD low-pass filter unit 206g, EVEN high-pass filter unit 207g, and the ODD high-pass filter unit 208g select respective signals DGi, DGi-a, DGi-b, and DGi-c to generate signals DGL-E, DGL-O, DGH-E, and DGH-O, as shown in FIG. 8A.

The EVEN low-pass filter units 205r and 205b, and the EVEN high-pass filter units 207g and 207b select respective signals DRi, DBi, DRi-a, DBi-a, DRi-b, DBi-b DRi-c, and DBi-c to generate signals DRL-E, DBL-E, DRH-E, and DBH-E. The ODD low-pass filter units 206r and 206b and the ODD high-pass filter units 208g and 208b select respective signals DRi-a, DBi-a, DRi-b, DBi-b DRi-c DBi-c DRi-d, and DBi-d to generate signals DRL-O, DBL-O, DRH-O, and DBH-O.

Thus, through the above signal processing of the signals generated by the EVEN low-pass filter units 205g, 205r, and 205b and the ODD low-pass filter units 206g, 206r, and 206b, the EVEN high-pass filter units 207g, 207r, and 207b, and the ODD high-pass filter units 208g, 208r, and 208b, the chrominance signals DGp-O, DGp-E, DRp-O, DRp-E, DBp-O, and DBp-E can be generated on the progressive scanning basis from the signals generated on the interlaced scanning basis.

Figure 8B:
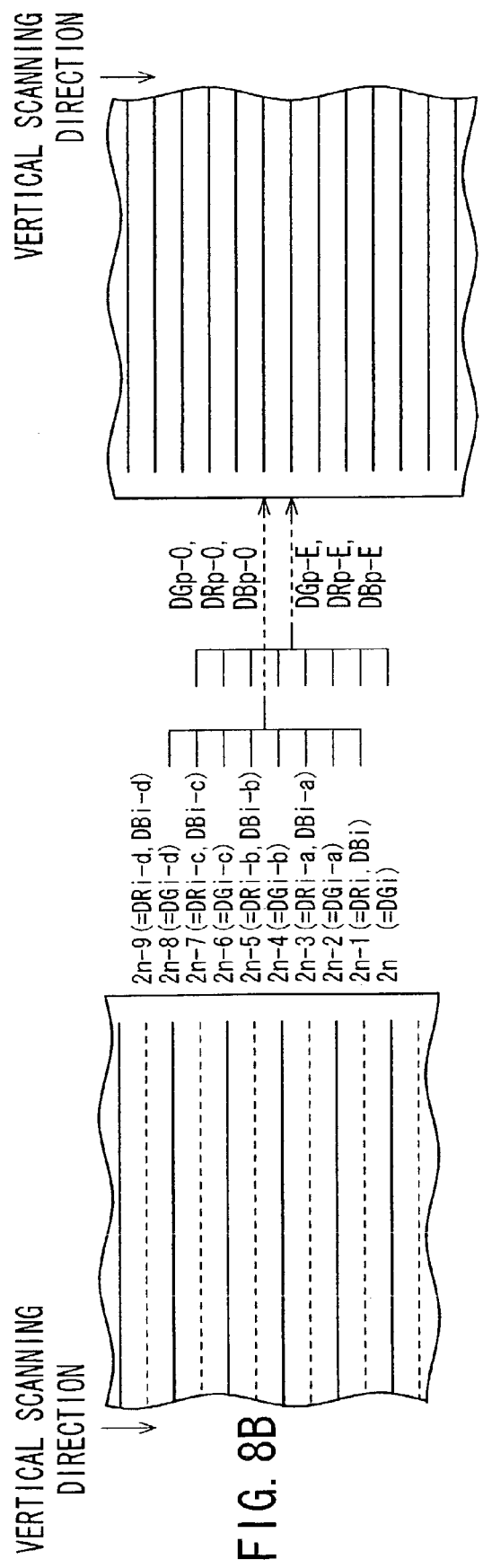

Next, supposing that the image pickup device 13G generates a chrominance signal SG of an EVEN line and the image pickup devices 13R and 13B respectively generate chrominance signals SR and SB of an ODD line, the EVEN low-pass filter unit 205g and the EVEN high-pass filter unit 207g select respective signals DGi, DGi-a, DGi-*b*, and DGi-c to generate signals DGL-E and DGH-E, as shown in FIG. 8B. The ODD low-pass filter unit 206g and the ODD high-pass filter unit 208g select signals DGi-a, DGi-b, DGi-c, and DGi-d to generate signals DGL-O and DGH-O.

The EVEN low-pass filter units 205r and 205b, the ODD low-pass filter units 206r and 206b, the EVEN high-pass filter units 207r and 207b, the ODD high-pass filter units 208r and 208b select respective signals DRi, DBi, DRi-a, DBi-a, DRi-b, DBi-b, DRi-c, and DBi-c to generate signals DRL-E, DBL-E, DRL-O, DBL-O, DRH-E, DBH-E, DRH-O, and DBH-O.

Thus, through the above signal processing of the signals generated by the EVEN low-pass filter units 205g, 205r, and 205b and the ODD low-pass filter units 206g, 206r, and 206b, the EVEN high-pass filter units 207g, 207r, and 207b, and the ODD high-pass filter units 208g, 208r, and 208b, the chrominance signals DGp-O, DGp-E, DRp-O, DRp-E, DBp-O, and DBp-E can be generated on the progressive scanning basis from the signals generated on the interlaced scanning basis.

It will be appreciated that in accordance with the invention, image signals can be generated on a progressive scanning basis using widely used conventional image pickup devices for an interlaced scanning without using image pickup devices for a progressive scanning.

It will be also appreciated that using no image pickup devices for the progressive scanning prevents operating frequencies of the image pickup devices from increasing and avoids causing a wide band signal processing circuit, thereby easily implementing an imaging apparatus used for the progressive scanning.

Figure 9:
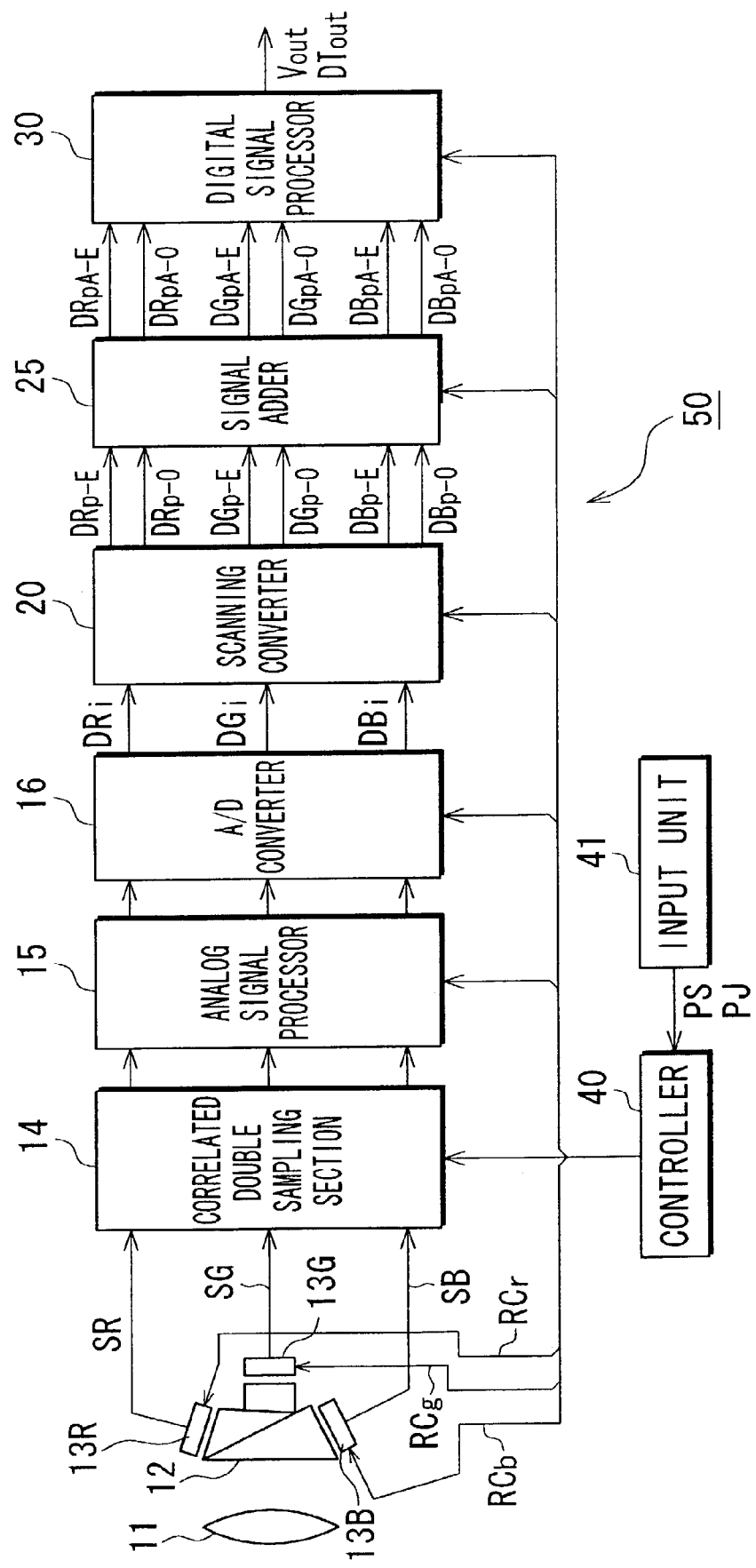
FIG. 9 is a block diagram representation of another scanning converter of the invention.

It is noted that the image signals on a progressive scanning basis according to the embodiment described above have the frame rate that is the same as the field rate of the image signal generated on the interlaced scanning basis. Therefore, in a second embodiment of the invention, there is provided an imaging apparatus 50 in which the frame rate can be regulated by adding the chrominance signals DRp, DGp, DBp generated on a progressive scanning basis by the scanning converter 20, as shown in FIG. 9. Like elements of the elements shown in FIGS. 1 and 9 are referred to by the same reference numerals, the detailed description of which is omitted.

Chrominance signals DGp, DRp, and DBp generated by the scanning converter 20 are supplied to a signal adder 25. The signal adder 25 has a memory, which is utilized to add up the respective chrominance signals DGp, DRp, and DBp of multiple frames before supplying them to the digital signal processor 30. For example, given a positive integer n, the signal adder 25 writes the chrominance signals DGp(2n−1), DRp(2n−1), and DBp(2n−1) of the (2n−1)th frame in the memory. The signal adder 25 read the chrominance signals DGp (2n−1), DRp (2n−1), and DBp (2n−1) out of the memory when the chrominance signals DGp (2n), DRp (2n), and DBp (2n) of the next (2n)th frame are supplied thereto. The signal adder 25 then adds these signals together every chrominance signals. The resultant chrominance signals DGpA DRpA, and DBpA are supplied to the digital signal processor 30.

Since each of these chrominance signals DGpA, DRpA, and DBpA amounts to the sum of the respective signal of two frames, the frame rate of each of the signals can be reduced to a half of the frame rate of each of the original progressive signals. Even if the signal levels of the chrominance signals DGi, DRi, and DBi are small, the signal levels of the new chrominance signals DGpA, DRpA, and DBpA could be larger since the new chrominance signals are obtained by adding the former chrominance signals belonging to two frames, thereby widening the dynamic range of chrominance signals DGpA, DRpA, and DBpA.

Alternatively, as a form available for the site of motion picture production, an imaging apparatus of the invention generates chrominance signals SR, SB, and SB of a field rate of 48 Hz by controlling the operations of image pickup devices 13R, 13G, and 13B. In this case, the chrominance signals DGp, DRp, and DBp outputted from the scanning converter have the frame rates of 48 Hz, so that the signal adder 25 can add the chrominance signals of 2 frames, thereby generating the chrominance signals DGpA, DRpA, DBpA having the frame rate of 24 Hz, which is the same as the frame rate of a motion picture (24 pictures per second). Therefore, in the image pickup devices 13R, 13G, and 13B, the chrominance signals are not required to have the field rate of 24 Hz, so that the imaging apparatus can generate the image signals having a preferred frame rate without making a major change in the frequency when the image pickup devices are driven.

In addition, by controlling the number of additive frames in the signal adder 25, the imaging apparatus easily can generate the preferred image signals having a wide range of frame rates on a progressive scanning basis without greatly changing the driving frequency of the image pickup devices 13R, 13G, and 13B. For example, an image signal having frame rate of 20 Hz can be generated on a progressive scanning basis by setting the additive frame number to 3 and the field rates of the image pickup devices 13R, 13G, and 13B to 60 Hz. If the additive frame number is set to 4, an image signal having the field rate of 15 Hz can be generated on a progressive scanning basis. Further, if both of the field rates of the image pickup devices 13R, 13G, and 13B and the additive frame number are changed simultaneously, image signals having a still wider frame rate can be easily obtained.

Incidentally, besides the imaging apparatus of the invention has a capability of taking a continuous image of an object, the apparatus has an electronic shutter function. When the additive frames are performed during the operation of the electronic shutter (hereinafter referred to as "shutter operation"), it is necessary to set an adequate exposure time of the electronic shutter for a period of the additive frames.

FIGS. 10A-10F illustrate the shutter operation of the apparatus. When a (2n−1)th frame and a (2n)th frame are added together to form an image of a single frame with the shutter function cut off, charging time for the two frames is not truncated, as shown in FIG. 10A.

When the exposure time is set to 75% of the 2-frame period, chrominance signals DGpA, DRpA, and DBpA are generated based on the charge stored in the 75% of the 2-frame periods. For example, supposing that time t1 indicates a time for starting the charging for (2n−1)th frame delayed by 25% of the 2-frame period, the chrominance signals DGp(2n−1), DRp(2n−1), and DBp(2n−1) for (2n−1)th frame are generated based on the charge stored after the time t1, as shown in FIG. 10B. The chrominance signals DGp(2n), DRp(2n), and DBp(2n) for the (2n)th frame are formed based on the charge stored in the (2n)th frame period, which is the same as that in the case when no shutter operation is performed. The chrominance signals DGpA, DRpA, and DBpA are generated by adding the chrominance signals DGp(2n−1), DRp(2n−1), and DBp(2n−1) and the chrominance signals DGp(2n), DRp(2n), and DBp(2n) together. The charge stored in the image pickup devices during non-exposure periods (i.e., during a period with the shutter closed) is discharged directly to the substrate of the devices or expelled via the respective vertical transfer registers immediately before the opening of the shutter, thereby preventing the charge from being affected during the exposure time.

When the exposure time is set to 50% of the 2-frame period, the chrominance signals DGpA, DRpA, and DBpA are generated based on the charge stored in the period of 50% of the 2-frame period. Such the chrominance signals DGpA, DRpA, and DBpA are obtained from, for example, the chrominance signals DGp(2n), DRp(2n), and DBp(2n) formed by the charge stored in the (2n)th frame, as shown in FIG. 10C, which are generated based on the charge stored in the same period as that of the case when no shutter operation is executed in the (2n)th frame.

As another example, when the exposure time is reduced to 25% of the 2-frame period, the chrominance signals DGpA, DRpA, and DBpA are generated based on the charge stored during the 25% of the 2-frame period. For example, supposing that time t2 indicates a time for starting the charging for (2n)th frame delayed by 25% of the 2-frame period, the chrominance signals DGp(2n), DRp(2n), and DBp(2n) for (2n)th frame are generated based on the charge stored after the time t2, as shown in FIG. 10D. The resultant signals are outputted as the chrominance signals DGpA, DRpA, and DBpA.

Alternatively, in stead of delaying the start timing of charging as described above, the charging period may be terminated earlier in accordance with the exposure time to generate the chrominance signals DGpA, DRpA, and DBpA, as shown in FIG. 10E. The chrominance signals DGpA, DRpA, and DBpA may be generated alternatively by regulating the start and finish timing of charging in accord with the exposure time, as shown in FIG. 10F.

Provision of a continuous exposure time for a period of additive frames as described above prevents false frames from occurring when the image signals obtained during an exposure time for individual frames are added. In other words, if an exposure time is set for each of the multiple additive frames to add multiple image signals when taking a moving object, the images of the object during the off-shutter periods are lost. Consequently, the image obtained by adding such image signals could appears false frames due to the loss image of signals. However, such false frames can be advantageously prevented from occurring by setting up a continuous exposure time for a period of additive frames because when taking a moving object, the images occur in succession.

The embodiment shown herein has a further advantage in that, when the scanning conversions shown in FIGS. 8A and 8B are executed in turn by switching the interlace fields from one to the other as is done in the variable phase mode in frame and field readouts, aliasing components, if any, could be cancel out due to the switch of interlace fields, thereby affecting little on the image signals. Such residual aliasing components occur when the aliasing components of the respective chrominance signals according to colors of the objects are not the same in magnitude. However, as an interlace field is switched to another, the residual components are inverted and cancel out so that the existing residual aliasing components can affect little the signals.

Thus has been described an imaging apparatus or the like for generating image signals on a progressive scanning basis utilizing image pickup devices used for an interlace scanning. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An imaging apparatus comprising:
    a multiplicity of image pickup devices used for an interlaced scanning;
    a controller for controlling said image pickup devices with at least one of said multiple image pickup devices and at least one of remaining image pickup devices thereof being driven on opposite interlaced fields to generate image signals on the interlaced scanning basis out of said respective image pickup devices; and
    a scanning converter for interpolating said image signals generated on the interlaced scanning basis into each other to generate image signals on a progressive scanning basis,
    wherein said scanning converter performs frequency band division on each of said image signals generated on the interlaced scanning basis to interpolate frequency-divided components obtained by said frequency band division in relation to luminance,
    wherein said scanning converter includes a frequency component generator for generating low-frequency components and high-frequency components of said image signals on the progressive scanning basis for each of said image signals generated on the interlaced scanning basis;

a luminance interpolating component generator for generating luminance-interpolating components based on said high-frequency components generated for each of said image signals generated on the interlaced scanning basis; and a component adder for adding said luminance-interpolating components to each of said lower components of said image signals generated on the progressive scanning basis.

2. An imaging apparatus comprising:

a multiplicity of image pickup devices used for an interlaced scanning;

a controller for controlling said image pickup devices with at least one of said multiple image pickup devices and at least one of remaining image pickup devices thereof being driven on opposite interlaced fields to generate image signals on the interlaced scanning basis out of said respective image pickup devices; and a scanning converter for interpolating said image signals generated on the interlaced scanning basis into each other to generate image signals on a progressive scanning basis, wherein said controller controls said multiplicity of image pickup devices with the interlace fields of said at least one of said multiplicity of image pickup devices and said at least one of remaining image pickup devices being alternately switched in turn every field periods.

3. An imaging apparatus comprising:

a multiplicity of image pickup devices used for an interlaced scanning;

a controller for controlling said image pickup devices with at least one of said multiple image pickup devices and at least one of remaining image pickup devices thereof being driven on opposite interlaced fields to generate image signals on the interlaced scanning basis out of said respective image pickup devices; and a scanning converter for interpolating said image signals generated on the interlaced scanning basis into each other to generate image signals on a progressive scanning basis, wherein said scanning converter performs frequency band division on each of said image signals generated on the interlaced scanning basis to interpolate frequency-divided components obtained by said frequency band division in relation to luminance, wherein said multiplicity of image pickup devices include green image pickup device for outputting green signals, red image pickup device for outputting red signals, and blue image pickup device for outputting blue signals, wherein said at least one, of the image pickup devices include said red and blue image pickup devices and said remaining image pickup device includes said green image pickup device, allowing said controller to drive said red and blue image pickup devices in an opposite interlace field with respect to said green image pickup device, and wherein said controller controls said red, green and blue image pickup devices with the interlace fields of said at least one of the red and blue pickup devices and said remaining green image pickup device being alternately switched in turn every field periods.

4. A method of imaging comprising the steps of:

simultaneously generating image signals on an interlaced scanning basis with mutually different interlace fields by means of a multiplicity of image pickup devices; and interpolating said image signals generated on the interlaced scanning basis into each other, thereby to generate image signals on a progressive scanning basis, wherein said step of interpolation comprises the sub-steps of:

performing frequency band division on each of said image signals generated on the interlaced scanning basis to interpolate frequency-divided components obtained by said frequency band division in relation to luminance;

generating low-frequency components and high-frequency components of said image signals generated on the progressive scanning basis for each of said image signals generated on the interlaced scanning basis;

generating luminance-interpolating components based on said high-frequency components generated for each of said image signals generated on the interlaced scanning basis; and adding said luminance-interpolating components to each of said lower components of said image signals generated on the progressive scanning basis.

5. The method according to claim 4, wherein said image signals generated on an interlaced scanning basis include the image signals having the respective different interlace fields, said image signals being obtained by alternately switching said interlace fields for each field period.

6. The method according to claim 4, wherein said image signals generated on an interlaced scanning basis include the image signals outputted from the image pickup device used for the interlaced scanning.

* * * * *